Patented Feb. 21, 1939

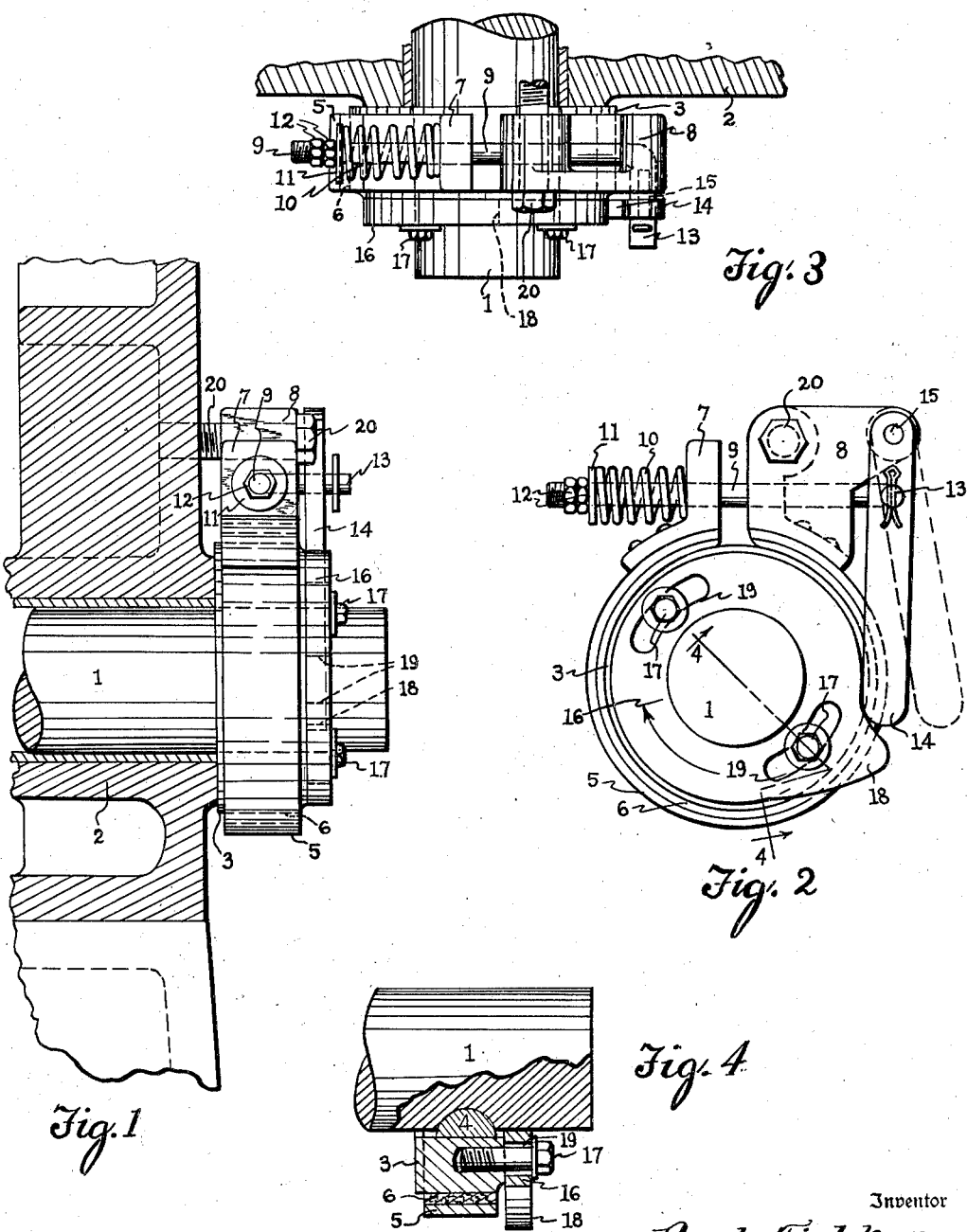

2,147,939

UNITED STATES PATENT OFFICE 2,147,939

BRAKE FOR MACHINE TOOLS

Paul Tishken, Detroit, Mich.

Application February 25, 1938, Serial No. 192,483

2 Claims. (Cl. 188—135)

This invention relates to brakes and particularly to automatically controlled brakes.

An object of the invention is to provide a brake, especially applicable to machine tools, and adapted to automatically limit rotation of a shaft or other rotating member to a single revolution.

Another object is to render such a brake responsive to a cam, turning with the shaft or other rotating member, and taking effect on a lever, at a definite point in each revolution, to apply a powerful frictional restraint to the rotating member.

A further object is to adapt the frictional restraint to be so regulated that rotation is halted immediately after the cam clears the lever.

These and various other objects are attained by the construction hereinafter described and illustrated in the accompanying drawing, wherein:

Fig. 1 is a view in side elevation of the improved brake applied to a shaft, sectionally showing a bearing for such shaft.

Fig. 2 is an end view of the same.

Fig. 3 is a top view of the brake.

Fig. 4 is a sectional detail view, taken on the line 4—4 of Fig. 2, showing the mounting of a control cam on the rotative member of the brake.

In these views, the reference character 1 designates a shaft journaled in a bearing 2 and rigidly carrying a brake collar 3 in proximity to said bearing. As illustrated, a key 4 secures said collar on the shaft. Peripherally engageable with said collar, is a flexible band 5 provided with the usual lining 6. The ends of the band are spaced, and rigidly carry brackets 7 and 8, in which a rod 9 is slidably mounted, in an approximately tangential relation to said ends. An end portion of said rod carries a coiled spring 10, normally slightly compressed between the bracket 7 and a washer 11, adjustably held on the rod by nuts 12. The other end portion of the rod is terminally pivotally connected at 13 to a lever 14, fulcrumed on the bracket 8 above the connection 13, as indicated at 15. The lever 14 extends downwardly to normally tangentially engage a ring 16 fitted on the shaft 1 adjacent to the collar 3 and secured to the latter by tap screws 17, such engagement being maintained by the spring 10. A cam 18 is formed integrally with and projects peripherally from the ring 16, being so disposed as to rock the lever outwardly from the brake axis, as indicated in dash lines in Fig. 2, substantially at the end of each revolution. Said ring and cam are formed of hardened steel, so as to best withstand the wear entailed in actuating said lever. As illustrated, the ring 16 and cam 18 are adapted to undergo a slight rotative adjustment on the shaft to aid in assuring the proper angular relation of the cam to any driving part (not shown), carried by the shaft. Thus the ring 16 is formed with arcuate slots 19 which accommodate the tap screws 17, and by loosening the latter, the clamped position of the ring may be varied. Said cam is approximately triangular, its leading face forming a gradual angle to the hub periphery, so as to readily deflect the lever outwardly, and its trailing face being approximately radial to the hub.

The band is suitably anchored to resist its rotation, the illustrated anchorage being a pin 20 rigidly carried by the bearing 2 and engaging the bracket 8.

In the operation of the described brake, the direction of rotation of the shaft is illustrated by the arrow in Fig. 2. On completion of each revolution, the cam rides against the lever, rocking the latter predeterminedly away from the brake axis. Resultant sliding of the rod 9 in the brackets 7 and 8 compresses the spring 10 and imposes a contractive stress on the band, determined in amount by the spring stress. Thus regulation of the spring stress, by varying the position of the nuts 12 and washer 11 on the rod, will correspondingly vary the contractive stress set up as the brake takes effect. The contractive stress is preferably so regulated as to terminate each revolution immediately after the cam has cleared the lever, as Fig. 2 illustrates.

The described brake finds utility in any machine or mechanism, in which it is required to halt rotation of a member as each revolution thereof is completed. This requirement generally applies, for example, to machines for cutting advancing elongated stock into definite lengths, without interrupting advance of the stock.

The invention is presented as including all such modifications and changes as come within the scope of the following claims.

What I claim is:

1. A brake comprising a rotative member, a friction element engageable with the periphery of such member, a spring adapted to load the friction element, a lever effective on such spring to stress the same and thereby apply said element to the rotative member, and an element rotative with the rotative member and engageable with said lever, substantially upon completion of a revolution, to apply the friction element to the rotative member.

2. A brake comprising a rotative member, a flexible band engageable with the periphery of such member and having spaced ends, brackets mounted on such ends, a rod slidable in at least one of said brackets, an abutment on such rod, a spring mounted on the rod between such abutment and one of the brackets, a lever pivoted on the other of said brackets and extending substantially tangentially to the rotative member, a control element carried by the rotative member and effective on said lever, substantially at completion of a revolution, to rock the lever outwardly from the axis of the brake, and a pivotal connection between said rod and lever, whereby said rocking of the lever is effective through said spring to contract the band.

PAUL TISHKEN.